United States Patent
Nakayama et al.

(10) Patent No.: US 6,949,902 B2
(45) Date of Patent: Sep. 27, 2005

(54) CONTROLLER OF ROTATING ELECTRIC MACHINE FOR VEHICLE

(75) Inventors: Masakazu Nakayama, Tokyo (JP); Masaru Kobayashi, Tokyo (JP); Masato Mori, Tokyo (JP); Kiyoharu Anzai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/011,102

(22) Filed: Dec. 15, 2004

(65) Prior Publication Data

US 2005/0093519 A1 May 5, 2005

(51) Int. Cl.[7] .............................................. H02P 7/00
(52) U.S. Cl. .................. 318/432; 318/147; 318/140; 318/722; 322/13; 322/14; 322/15; 322/16; 322/39; 701/22
(58) Field of Search ................................. 318/432, 722, 318/140; 322/14, 15, 16, 13, 39; 701/22

(56) References Cited

U.S. PATENT DOCUMENTS

| | | | | |
|---|---|---|---|---|
| 3,845,372 A | * | 10/1974 | Ringland et al. | 318/779 |
| 3,908,161 A | * | 9/1975 | Messenger | 322/29 |
| 3,979,650 A | * | 9/1976 | Jamison et al. | 318/150 |
| 4,262,209 A | * | 4/1981 | Berner | 290/7 |
| 4,392,100 A | * | 7/1983 | Stanton et al. | 318/803 |
| 5,113,125 A | * | 5/1992 | Stacey | 318/721 |
| 5,550,445 A | * | 8/1996 | Nii | 318/153 |
| 5,587,647 A | * | 12/1996 | Bansal et al. | 322/45 |
| 5,818,116 A | * | 10/1998 | Nakae et al. | 290/38 R |
| 5,949,210 A | * | 9/1999 | Gataric et al. | 318/609 |
| 6,253,127 B1 | * | 6/2001 | Itoyama et al. | 701/22 |
| 6,426,608 B2 | * | 7/2002 | Amano et al. | 320/163 |
| 2003/0071588 A1 | * | 4/2003 | Iwaji et al. | 318/254 |

FOREIGN PATENT DOCUMENTS

JP 2001-69797 A 3/2001

* cited by examiner

*Primary Examiner*—Rita Leykin
(74) *Attorney, Agent, or Firm*—Sughrue Mion, PLLC

(57) ABSTRACT

A controller of a rotating electric machine for a vehicle has a magnetic field electric current command arithmetic device for commanding a magnetic field electric current by the command of a torque and electric power command arithmetic device, an electric power converter functioning as a rectifier or an inverter, and a magnetic field electric current command restraining device for restraining a three-phase line electric current by restraining and controlling an output of the magnetic field electric current command arithmetic device when the rotating electric machine functions as an electric generator.

5 Claims, 6 Drawing Sheets

CONTROLLER OF ROTATING ELECTRIC MACHINE FOR VEHICLE

BACKGROUND OF THE INVENTION

1. Field of the Invention

The present invention relates to a controller of a rotating electric machine for a vehicle using a winding type synchronous machine, particularly the controller of the rotating electric machine for a vehicle having a restraining function of a magnetic field electric current.

2. Description of the Related Art

The rotating electric machine for a vehicle is mounted to the vehicle and is used as a synchronous electric motor at a starting time of an internal combustion engine, and is also used as a charging electric generator after the internal combustion engine is started. In this rotating electric machine for a vehicle, it is required that the internal combustion engine is rapidly started by generating large torque as much as possible at the starting time of the internal combustion engine, and large generated electric power is supplied as much as possible from low speed rotation to high speed rotation after the internal combustion engine is started, and a battery mounted to the vehicle is charged while sufficient electric power is supplied with respect to a large electric load. In particular, it is required to obtain large generated electric power in the case of the large load even at an idle rotating time of the internal combustion engine.

To achieve such an object, a technique for optimally designing a rotator as a field magnet and improving a magnetic flux amount generated by the rotator is adopted in the general winding type synchronous machine. For example, the ampere turn of a field magnet coil of the rotator is increased as much as possible, and the magnetic flux amount is intended to be increased by simultaneously using the field magnet using a permanent magnet in the rotator of the winding type synchronous machine. In accordance with such a construction, the internal combustion engine can be rapidly started and a sufficient generated electric power output can be increased in a total rotating area. However, an excessive increase of the output in the high speed rotating area gives excessive stress to an electric power converter and the rotating electric machine itself. Therefore, there is a case in which it is necessary to restrain the ampere turn of the field magnet coil at the high speed rotating time.

In the technique disclosed in patent literature 1, the field magnet coil is simultaneously used in a magnet electric generator used in a compact two-wheeled vehicle. However, a magnetic field electric current at the high speed rotating time of the rotating electric machine functioning as an electric generator and a starting electric motor is controlled. When the rotating electric machine directly connected to a crank shaft is used as the electric generator, the upper limit value of an output electric current after rectification is set every rotating speed. When there is a possibility that the output electric current exceeds this upper limit value, this direct current output electric current is controlled so as not to exceed the upper limit value by controlling the magnetic field electric current. The magnetic field electric current controls the generated electric power output in a duty ratio by performing PWM control in accordance with the output electric current.

[Patent literature 1]
JP-A-2001-69797 (pages 4 to 5 and FIGS. 1 to 3)

In the above conventional device, the upper limit value of the output electric current can be also restrained by controlling the magnetic field electric current at the high speed rotating time. However, in the rotating electric machine mounted to the vehicle, its operation must be continued without causing any trouble due to an excessive electric current at all. Therefore, it is necessary to detect the excessive electric current of a line electric current in an alternating current electric path from the rotating electric machine as a multi-phase alternating current electric generator to the electric power converter, and precisely restrain this excessive electric current. Further, it is necessary to protect the rotating electric machine, the electric power converter and the electric path between the rotating electric machine and the electric power converter from deterioration.

SUMMARY OF THE INVENTION

This invention is made to solve such problems, and its object is to obtain a controller of the rotating electric machine for a vehicle able to set the line electric current of the rotating electric machine as a multi-phase alternating current electric generator to a continuous maximum rated electric current or less, and prevent the deterioration of the rotating electric machine, the electric power converter and the electric path between the rotating electric machine and the electric power converter.

A controller of a rotating electric machine for a vehicle in this invention comprises:

the rotating electric machine constructed by a winding type synchronous machine of multiple phases functioning as an electric motor and an electric generator;

line electric current detecting means for detecting a line electric current of each phase of the rotating electric machine;

magnetic field electric current detecting means for detecting a magnetic field electric current of the rotating electric machine;

torque and electric power command arithmetic means for commanding a torque value when the rotating electric machine functions as the electric motor, and commanding an electric power generating amount when the rotating electric machine functions as the electric generator;

line electric current command arithmetic means for commanding the line electric current of each phase of the rotating electric machine by the command of the torque and electric power command arithmetic means while feedback-controlling this line electric current by the detecting value of the line electric current detecting means;

magnetic field electric current command arithmetic means for commanding the magnetic field electric current of the rotating electric machine by the command of the torque and electric power command arithmetic means while feedback-controlling this magnetic field electric current by the detecting value of the magnetic field electric current detecting means;

an electric power converter functioning as a rectifier when the rotating electric machine functions as the electric generator, and also functioning as an inverter when the rotating electric machine functions as the electric motor; and magnetic field electric current command restraining means for restraining the line electric current of each phase by controlling the output of the magnetic field electric current command arithmetic means when the rotating electric machine functions as the electric generator.

DESCRIPTION OF THE PREFERRED EMBODIMENTS

Embodiment Mode 1.

Figure 1:
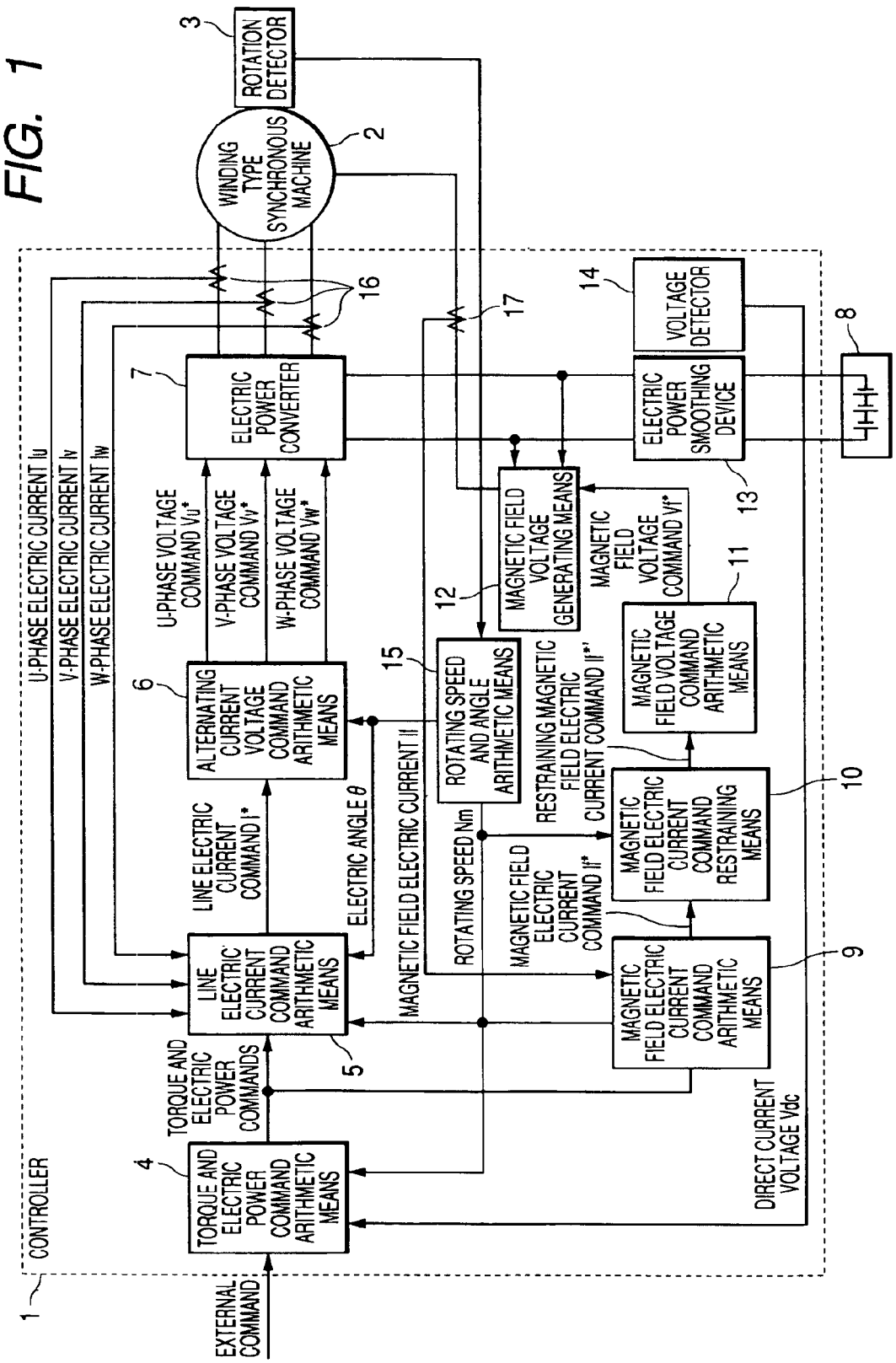
FIG. 1 is a block diagram for explaining a controller of a rotating electric machine for a vehicle in accordance with an embodiment mode 1 of this invention.
Figure 2:
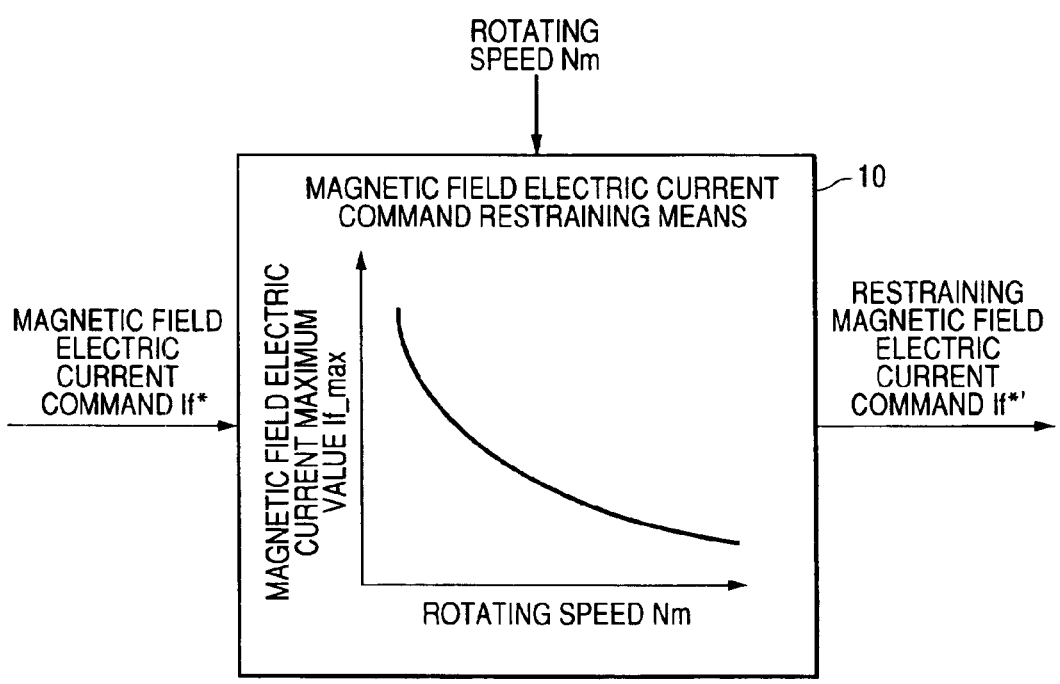
FIG. 2 is an explanatory view for explaining magnetic field electric current restraining contents of the controller of the rotating electric machine for a vehicle in accordance with the embodiment mode 1 of this invention.

FIG. 1 is a block diagram for explaining the construction of a controller of a rotating electric machine for a vehicle in accordance with an embodiment mode 1 of this invention. FIG. 2 is an explanatory view for explaining the restraining contents of a magnetic field electric current. In FIG. 1, the controller 1 is a control means for controlling the operation of the rotating electric machine 2 at a starting time and an accelerating time or an electric power generating time of an unillustrated internal combustion engine. For example, the rotating electric machine 2 is a synchronous electric generator and motor having armature (stator) winding of three phases and connected from the unillustrated internal combustion engine directly or by a belt. The rotating electric machine 2 has a rotation detector 3 for detecting a rotating angle and a rotating speed.

The controller 1 is constructed as follows. Namely, a torque and electric power command arithmetic means 4 calculates and commands a torque instruction amount when the rotating electric machine 2 functions as an electric motor by an external command. The torque and electric power command arithmetic means 4 also calculates and commands an electric power generating amount when the rotating electric machine 2 functions as an electric generator. A line electric current command arithmetic means 5 calculates and commands a line electric current of the armature winding in the rotating electric machine 2 required to obtain predetermined torque or electric power generating amount on the basis of the torque or the electric power generating command calculated by the torque and electric power command arithmetic means 4. An alternating current voltage command arithmetic means 6 calculates and commands an alternating current voltage value required to generate the predetermined torque or generated electric power on the basis of the line electric current command value calculated by the line electric current command arithmetic means 5.

Further, an electric power converter 7 is constructed by plural switching elements and rectifying elements. When the rotating electric machine 2 functions as an electric motor, the electric power converter 7 functions as an inverter for converting direct current electric power from a vehicle mounting battery 8 into alternating current electric power on the basis of the alternating current voltage command value calculated by the alternating current voltage command arithmetic means 6. When the rotating electric machine 2 functions as an electric generator, the electric power converter 7 functions as a rectifier for converting the alternating current electric power generated by the rotating electric machine 2 into direct current electric power and charging the vehicle mounting battery 8. A magnetic field electric current command arithmetic means 9 calculates a magnetic field electric current command value of the rotating electric machine 2 required to obtain a torque value or an electric power generating amount based on the torque instruction amount or the electric power generating amount calculated by the torque and electric power command arithmetic means 4.

A magnetic field electric current command restraining means 10 performs restraint according to the rotating speed of the rotating electric machine 2, etc. or makes a correction as described later with respect to the magnetic field electric current command value calculated by the magnetic field electric current command arithmetic means 9. A magnetic field voltage command arithmetic means 11 calculates a magnetic field voltage command value of the rotating electric machine 2 required to obtain a predetermined desirable torque value or electric power generating amount on the basis of the magnetic field electric current command of the magnetic field electric current command arithmetic means 9 or the magnetic field electric current command restraining means 10. A magnetic field voltage generating means 12 applies a magnetic field voltage to the field magnet coil of the rotating electric machine 2 on the basis of the magnetic field voltage command value calculated by the magnetic field voltage command arithmetic means 11.

For example, a voltage smoothing means 13 is constructed by a capacitor of large capacity, and restrains the change of a direct current voltage caused by the operation of a switching element of the electric power converter 7. A voltage detecting means 14 detects the voltage applied from the vehicle mounting battery 8 to the controller 1. A rotating speed and angle arithmetic means 15 calculates the rotating speed and the rotating angle of the rotating electric machine 2 by the output of the rotation detector 3. A line electric current detecting means 16 detects the value of the line electric current flowed to the armature winding of the rotating electric machine 2. A magnetic field electric current detecting means 17 detects the value of the magnetic field electric current flowed to the field magnet coil of the rotating electric machine 2.

In the controller of the rotating electric machine for a vehicle in accordance with the embodiment mode 1 of this invention constructed in this way, the rotating electric machine 2 is used as an electric motor at the starting time of the internal combustion engine. The torque command value calculated by the torque and electric power command arithmetic means 4 is inputted to the line electric current command arithmetic means 5 and the magnetic field electric current command arithmetic means 9. The line electric current command arithmetic means 5 calculates the line electric current of the rotating electric machine 2 for obtaining torque, and gives commands to the alternating current voltage command arithmetic means 6. The alternating current voltage command arithmetic means 6 gives the command of the alternating current voltage value to the electric power converter 7, and sets the line electric current flowed to the armature winding of the rotating electric machine 2 to a predetermined value calculated by the line electric current command arithmetic means 5. On the other hand, the magnetic field electric current command value calculated by the magnetic field electric current command arithmetic means 9 is given to the magnetic field voltage generating means 12 via the magnetic field voltage command arithmetic means 11, and a magnetic field voltage conformed to the magnetic field electric current command value is set. When the rotating electric machine 2 functions as an electric motor, no magnetic field electric current command restraining means 10 restrains the magnetic field electric current command value.

The line electric current detecting means 16 detects the line electric current of the rotating electric machine 2 and gives this line electric current to the line electric current command arithmetic means 5. The magnetic field electric current detecting means 17 detects the magnetic field electric current value of the rotating electric machine 2, and gives this magnetic field electric current value to the magnetic field electric current command arithmetic means 9. The line electric current and the magnetic field electric current value are respectively feedback-controlled. Further, the rotating speed and angle arithmetic means 15 calculates the rotating speed and the rotating angle of the rotating electric machine 2 on the basis of a signal of the rotation detector 3. However, the rotating speed is inputted to the torque and electric power command arithmetic means 4, the line electric current command arithmetic means 5 and the alternating current voltage command arithmetic means 6, and is used as an element for determining each command value. In contrast to this, the rotating angle is inputted to the line electric current command arithmetic means 5 and the alternating current voltage command arithmetic means 6, and publicly known vector control is performed by detecting the phase of the rotating electric machine 2.

The electric power converter 7 converts the direct current voltage from the vehicle mounting battery 8 into an artificial alternating current voltage of a value given from the alternating current voltage command arithmetic means 6, and gives this alternating current voltage to the armature winding of the rotating electric machine 2. The magnetic field voltage generating means 12 PWM-controls the direct current voltage of the vehicle mounting battery 8 by a switching element such as FET, etc. on the basis of the magnetic field voltage command value calculated by the magnetic field voltage command arithmetic means 11, and gives this direct current voltage to the field magnet coil of the rotating electric machine 2. Thus, the torque of the rotating electric machine 2 is controlled as an electric motor, and the starting operation of the internal combustion engine, etc. are performed. A voltage change caused by switching operations of the electric power converter 7 and the magnetic field voltage generating means 12 is smoothed by the voltage smoothing means 13, and the voltage change of the vehicle mounting battery 8 is detected by the voltage detecting means 14 and is inputted to the torque and electric power command arithmetic means 4. The torque command value is then corrected.

When the starting of the internal combustion engine is completed and the rotating electric machine 2 starts an electric power generating operation as an electric generator and particularly performs the electric power generating operation in relatively high speed rotation, the electric power converter 7 is operated as a three-phase full wave rectifier, or performs a synchronous operation (including a control case in phase) of a power element equivalent to the three-phase full wave rectifier. In this case, the alternating current voltage command arithmetic means 6 calculates the alternating current voltage command value so as to operate the electric power converter 7 as the three-phase full wave rectifier or perform the synchronous operation of the power element equivalent to the three-phase full wave rectifier without referring to the output of the line electric current command arithmetic means 5.

On the other hand, the magnetic field electric current command arithmetic means 9 calculates the magnetic field electric current command value with reference to the electric power command from the torque and electric power command arithmetic means 4. At this time, when the electric load of the vehicle is large, a large generated electric power output is required and the magnetic field electric current command value is also increased in accordance with this large generated electric power output. When the magnetic field electric current command value becomes greater than a predetermined value determined by the rotating speed, the magnetic field electric current command value is corrected in accordance with a maximum value of the magnetic field electric current calculated by the magnetic field electric current command restraining means 10. The magnetic field electric current command value after the correction is inputted to the magnetic field voltage command arithmetic means 11 and the magnetic field electric current flowed to the field magnet coil of the rotating electric machine 2 becomes a restrained value.

As shown in FIG. 2, the magnetic field electric current command restraining means 10 applies a map for setting a maximum value If_max of the magnetic field electric current to an output variable with the rotating speed Nm as an input variable with respect to the magnetic field electric current command value If* inputted from the magnetic field electric current command arithmetic means 9. The magnetic field electric current command restraining means 10 then corrects the amount of this magnetic field electric current command value If*. The magnetic field electric current command restraining means 10 further calculates and outputs a restraining magnetic field electric current command value If*'. It is also possible to apply the function of $$If^{*'} = f(If^*, Nm)$$

with the magnetic field electric current command value If* and the rotating speed Nm as input variables without using the map.

When a large generated electric power output is required in the high speed rotation as mentioned above, the restraining magnetic field electric current command value If*' is adjusted with reference to the rotating speed Nm and the magnetic field electric current value is limited to a suitable range. Accordingly, the electric power converter 7 and the rotating electric machine 2 can be operated without being burned and damaged or deteriorated by flowing an excessive line electric current as the output of the rotating electric machine 2. Thus, when the electric load is large, the burning damage and the deterioration of the electric power converter 7 and the rotating electric machine 2 due to the excessive line electric current can be prevented by flowing the magnetic field electric current restrained to a predetermined value while the electric power according to the electric load is outputted.

Embodiment Mode 2.

Figure 3:
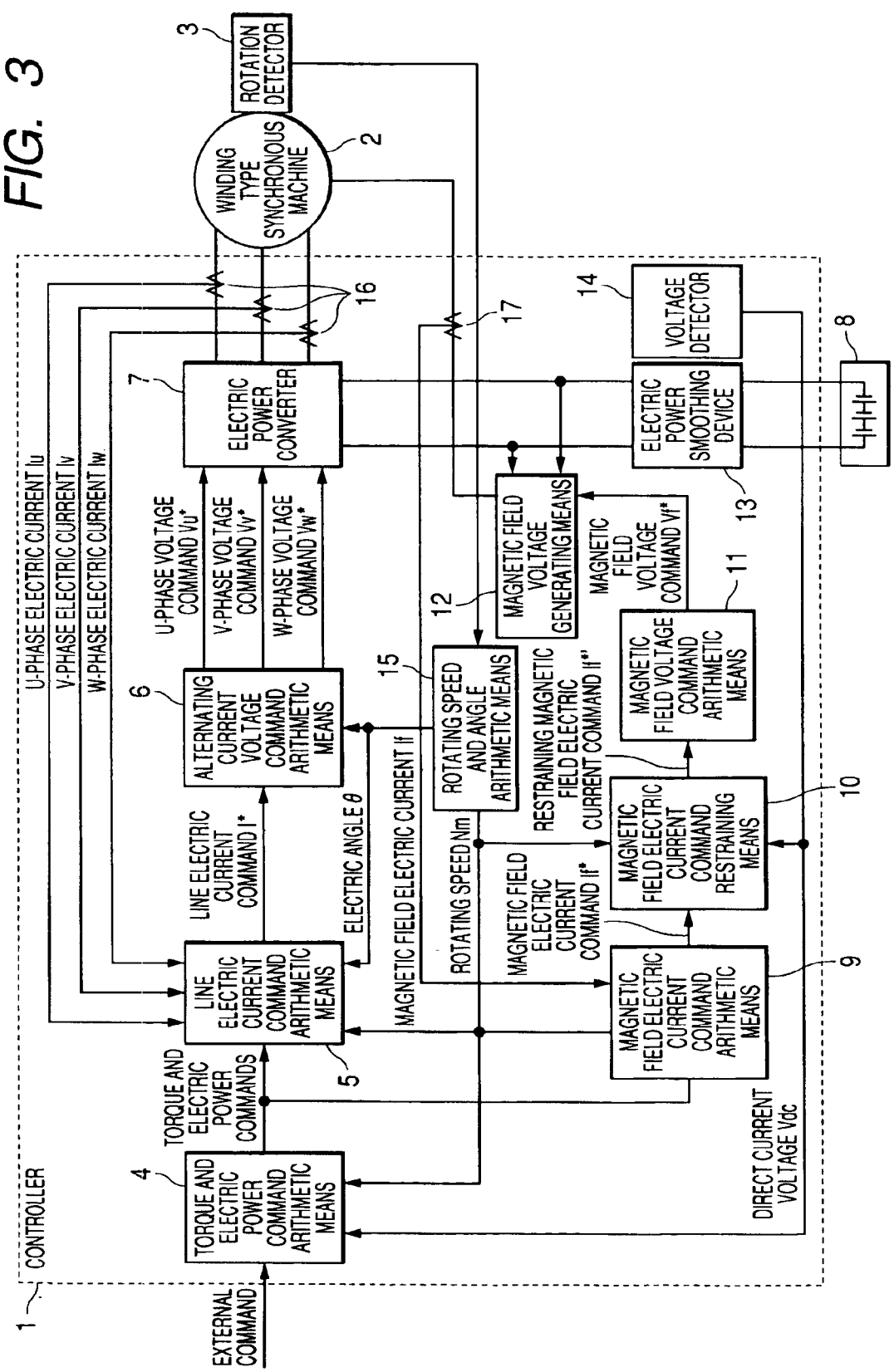
FIG. 3 is a block diagram for explaining a controller of a rotating electric machine for a vehicle in accordance with an embodiment mode 2 of this invention.
Figure 4:
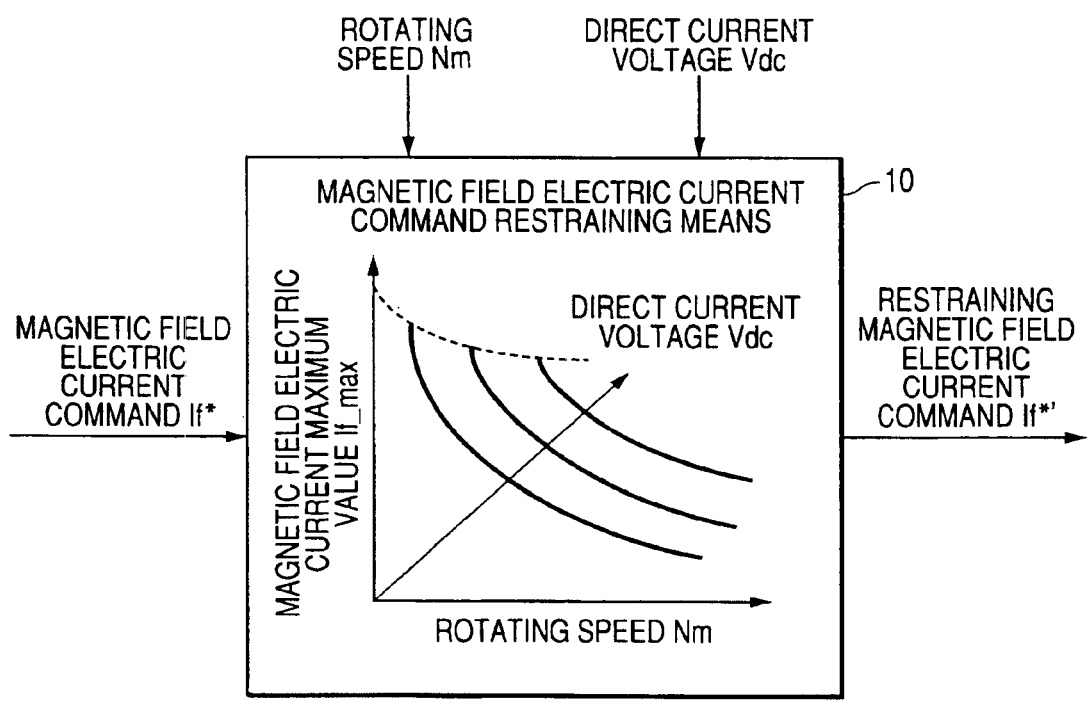
FIG. 4 is an explanatory view for explaining magnetic field electric current restraining contents of the controller of the rotating electric machine for a vehicle in accordance with the embodiment mode 2 of this invention.

FIG. 3 is a block diagram for explaining the construction of a controller of a rotating electric machine for a vehicle in accordance with an embodiment mode 2 of this invention. FIG. 4 is a characteristic view for explaining control contents of the magnetic field electric current. In these figures, the same functional portions as the above embodiment mode 1 are designated by the same reference numerals. In the controller of the rotating electric machine for a vehicle in accordance with this embodiment mode, the magnetic field electric current command restraining means 10 calculates the restraining magnetic field electric current command value If*' with reference to the rotating speed Nm and the voltage Vdc of the vehicle mounting battery 8 applied to the system.

As shown in FIG. 4, the magnetic field electric current command restraining means 10 applies a map for setting a maximum value If_max of the magnetic field electric current to an output variable with the rotating speed Nm and the direct current voltage Vdc as input variables with respect to the magnetic field electric current command value If* inputted from the magnetic field electric current command arithmetic means 9. The magnetic field electric current command restraining means 10 then corrects the amount of this magnetic field electric current command value If*, and calculates and outputs the restraining magnetic field electric current command value If*'. It is also possible to apply the function of $$If^{*\prime} = f(If^*, Nm, Vdc)$$

with the magnetic field electric current command value If*, the rotating speed Nm and the direct current voltage Vdc as input variables without using the map.

Thus, effects similar to those in the embodiment mode 1 are obtained by calculating the restraining magnetic field electric current command value If*' with reference to the direct current voltage Vdc as well as the rotating speed Nm. Further, for example, when the direct current voltage Vdc is changed by a charging state of the vehicle mounting battery 8, the line electric current can be more accurately controlled. This is because the line electric current is also influenced by the direct current voltage Vdc in addition to the magnetic field electric current If and the rotating speed Nm. For example, when the direct current voltage Vdc is low, the line electric current is increased in comparison with a case in which the direct current voltage Vdc is high. Accordingly, when the voltage of the vehicle mounting battery 8 is low, the output electric current of the rotating electric machine 2 is increased. The correction is required so as to reduce the restraining magnetic field electric current command value If*' to compensate this increase of the output electric current of the rotating electric machine 2.

Embodiment Mode 3.

Figure 5:
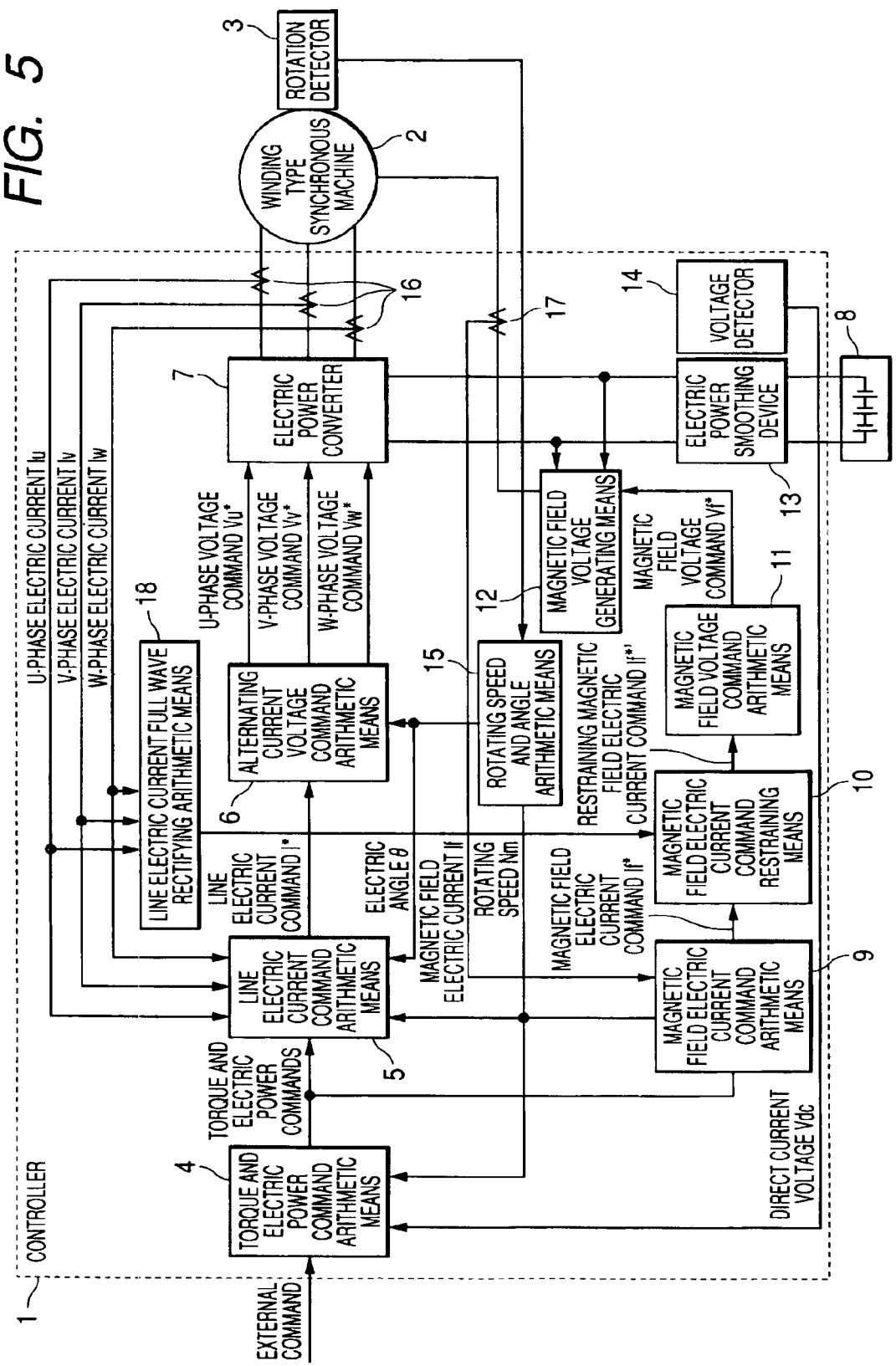
FIG. 5 is a block diagram for explaining a controller of a rotating electric machine for a vehicle in accordance with an embodiment mode 3 of this invention.
Figure 6:
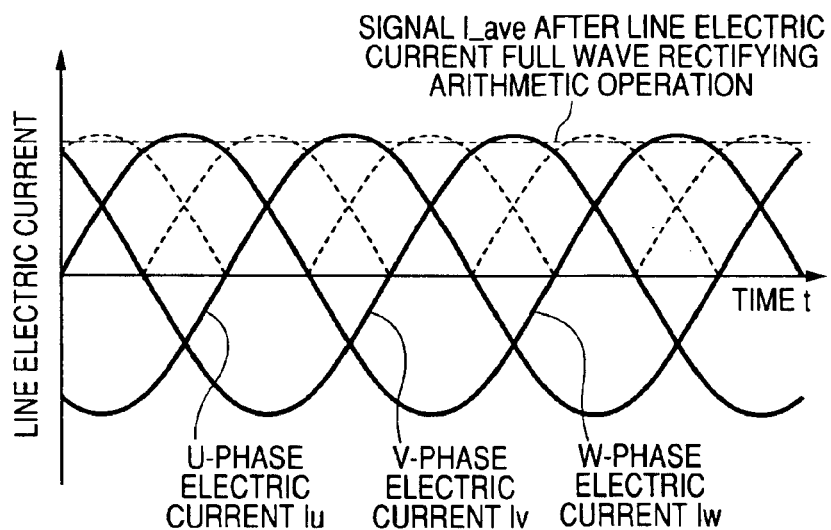
FIG. 6 is an explanatory view for explaining a line electric current full wave rectifying arithmetic means of the controller of the rotating electric machine for a vehicle in accordance with the embodiment mode 3 of this invention.
Figure 7:
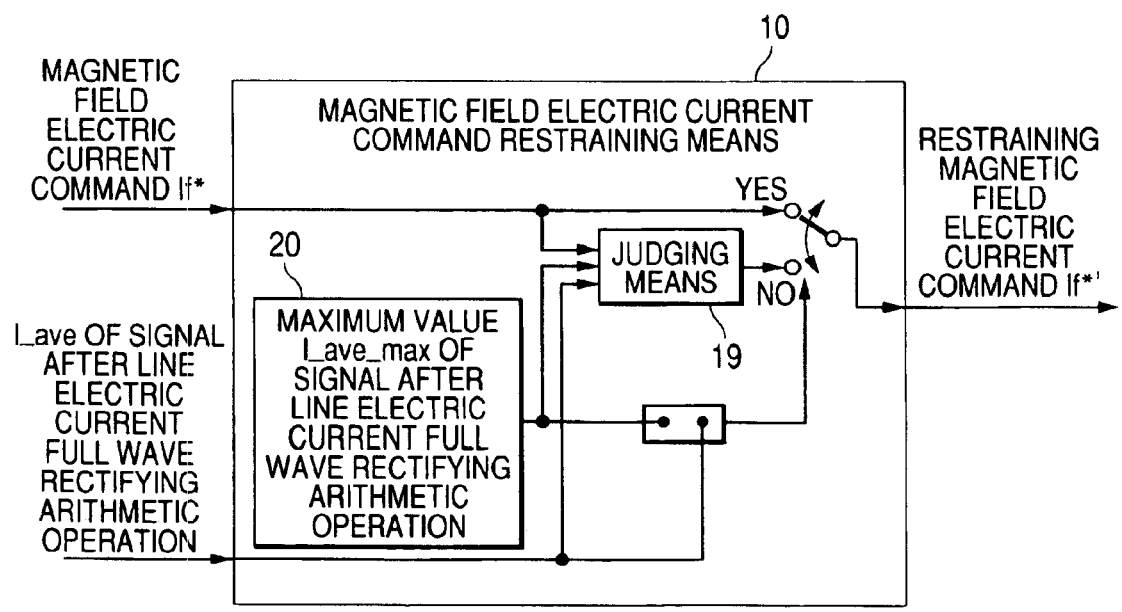
FIG. 7 is an explanatory view of a magnetic field electric current command restraining means used in the controller of the rotating electric machine for a vehicle in accordance with the embodiment mode 3 of this invention.

FIGS. 5 to 7 explain the controller of the rotating electric machine for a vehicle in accordance with an embodiment mode 3 of this invention. FIG. 5 is a block diagram for explaining the construction of this controller. FIG. 6 is a view for explaining the operation of a line electric current full wave rectifying arithmetic means. FIG. 7 is a block diagram for explaining the details of the magnetic field electric current command restraining means. In these figures, the same functional portions as the above embodiment modes 1 and 2 are designated by the same reference numerals. In the controller of the rotating electric machine for a vehicle in this embodiment mode, the arithmetic method of the magnetic field electric current command restraining means is changed in comparison with the above embodiment modes 1 and 2.

In this embodiment mode, as shown in FIG. 5, instead of the rotating speed Nm, a signal from the line electric current full wave rectifying arithmetic means 18 is inputted to the magnetic field electric current command restraining means 10. As shown in FIG. 7, a judging means 19 is arranged in the magnetic field electric current command restraining means 10. The judging means 19 monitors the signal Iave from the line electric current full wave rectifying arithmetic means 18 and is operated so as to restrain the magnetic field electric current when it is judged that the line electric current is excessive.

As shown in FIG. 6, the line electric current full wave rectifying arithmetic means 18 performs the full wave rectification of the line electric current of each phase, and obtains a direct current signal I_ave from the alternating current line electric current. In the arithmetic operation at this time, the line electric current value of each phase is not necessarily required in the case of three phases, and the sum total of the electric current values of the respective phases becomes zero. Accordingly, if the line electric currents of at least two phases are detected, the direct current signal I_ave is obtained. This direct current signal I_ave is proportional to the magnitude of the line electric current, and the restraining magnetic field electric current command value If*' is calculated as follows by using this direct current signal I_ave.

As shown in the magnetic field electric current command restraining means 10 of FIG. 7, a maximum value direct current signal I_ave_max corresponding to the maximum value of the line electric current is stored to a memory means 20, etc. in advance. The judging means 19 compares this maximum value direct current signal I_ave_max and the direct current signal I_ave from the line electric current full wave rectifying arithmetic means 18. When the maximum value direct current signal I_ave_max is greater than the direct current signal I_ave, it is not necessary to restrain the magnetic field electric current command value If*. Accordingly, the value of the magnetic field electric current command value If* is outputted as it is. In contrast to this, when the direct current signal I_ave is greater than the maximum value direct current signal I_ave_max, the magnetic field electric current is limited and is set to the restraining magnetic field electric current command value If*'.

This restraining magnetic field electric current command value If*' is calculated by the judging means 19 by using the magnetic field electric current command value If*, the direct current signal I_ave and the maximum value direct current signal I_ave_max. This calculation is made by using the deviation between the maximum value direct current signal I_ave_max and the direct current signal I_ave. At this time, the restraining magnetic field electric current command value If*' can be determined by using a predetermined function with respect to this deviation. Further, proportional integration (PI) control may be also performed by using the deviation.

The line electric current can be accurately prevented from becoming excessive without considering a characteristic change due to individual differences and operating states of the electric power converter 7 and the rotating electric machine 2 by using the restraining magnetic field electric current command value If*' calculated in this way.

Embodiment Mode 4.

In this embodiment mode, a temperature sensor is arranged in the rotating electric machine 2 or the electric power converter 7. The maximum value If_max of the magnetic field electric current described in the embodiment mode 1, or the maximum value direct current signal I_ave_max described in the embodiment mode 3 is corrected by a detecting value of this temperature sensor. Concretely, when the detecting temperature of one or both of the temperature sensors arranged in the rotating electric machine 2 and the electric power converter 7 is low, the correction is made in a direction for increasing the maximum value of the magnetic field electric current or the maximum value direct current signal. In contrast to this, when the detecting temperature is high, the correction is made in a direction for reducing the maximum value of the magnetic field electric current or the maximum value direct current signal. Thus, control according to the temperature state of the system is performed.

In accordance with such a construction, excessive restraint can be prevented and generated electric power according to the state can be obtained at its maximum. The maximum value of the magnetic field electric current with respect to the detecting value of the temperature sensor, or the correcting amount of the maximum value direct current signal can be calculated by a map determined in advance, and can be also calculated by an arithmetic operation on the basis of a predetermined function.

In each of the above embodiment modes, the magnetic field electric current command value If* is restrained by the magnetic field electric current command restraining means 10, and is given to the magnetic field voltage command arithmetic means 11. However, the control arithmetic system can be also constructed so as to constantly set the direct current voltage Vdc directly from the magnetic field voltage command arithmetic means 11 with only the direct current voltage as an input variable. In this case, effects similar to those in each of the above embodiment modes are obtained by arranging a restraining means of the magnetic field electric current at the subsequent stage of the magnetic field voltage command arithmetic means 11.

As explained above, the controller of the rotating electric machine for a vehicle in this invention comprises:

the rotating electric machine constructed by a winding type synchronous machine of three phases functioning as an electric motor and an electric generator;

three-phase line electric current detecting means for detecting a three-phase line electric current of the rotating electric machine;

magnetic field electric current detecting means for detecting a magnetic field electric current;

torque and electric power command arithmetic means for commanding a torque value when the rotating electric machine functions as the electric motor, and commanding an electric power generating amount when the rotating electric machine functions as the electric generator;

line electric current command arithmetic means for commanding the three-phase line electric current by the command of the torque and electric power command arithmetic means;

magnetic field electric current command arithmetic means for commanding the magnetic field electric current by the command of the torque and electric power command arithmetic means;

an electric power converter functioning as a rectifier or an inverter; and magnetic field electric current command restraining means for restraining the three-phase line electric current by controlling the output of the magnetic field electric current command arithmetic means when the rotating electric machine functions as the electric generator.

The magnetic field electric current command restraining means restrains the output line electric current of the rotating electric machine to a predetermined maximum value. Accordingly, the electric power converter and the rotating electric machine, or an alternating current electric path can be operated without being burned and damaged or deteriorated by flowing an excessive line electric current as an output of the rotating electric machine. Accordingly, when an electric load is large, the burning damage and the deterioration of the electric power converter and the rotating electric machine due to the excessive line electric current can be prevented by flowing the magnetic field electric current restrained to a predetermined maximum value while electric power according to the electric load is outputted.

What is claimed is:

1. A controller of a rotating electric machine for a vehicle comprising:

the rotating electric machine constructed by a winding type synchronous machine of multiple phases functioning as an electric motor and an electric generator;

line electric current detecting means for detecting a line electric current of each phase of said rotating electric machine;

magnetic field electric current detecting means for detecting a magnetic field electric current of said rotating electric machine;

torque and electric power command arithmetic means for commanding a torque value when said rotating electric machine functions as the electric motor, and commanding an electric power generating amount when said rotating electric machine functions as the electric generator;

line electric current command arithmetic means for commanding the line electric current of each phase of said rotating electric machine by the command of said torque and electric power command arithmetic means while feedback-controlling this line electric current by the detecting value of said line electric current detecting means;

magnetic field electric current command arithmetic means for commanding the magnetic field electric current of said rotating electric machine by the command of said torque and electric power command arithmetic means while feedback-controlling this magnetic field electric current by the detecting value of said magnetic field electric current detecting means;

an electric power converter functioning as a rectifier when said rotating electric machine functions as the electric generator, and also functioning as an inverter when said rotating electric machine functions as the electric motor; and magnetic field electric current command restraining means for restraining the line electric current of said each phase by controlling the output of said magnetic field electric current command arithmetic means when said rotating electric machine functions as the electric generator.

2. The controller of the rotating electric machine for a vehicle according to claim 1, wherein the controller further comprises rotating speed arithmetic means for detecting the rotating speed of said rotating electric machine, and said magnetic field electric current command restraining means sets a continuous maximum rated line electric current of said rotating electric machine according to the rotating speed, and controls the output of said magnetic field electric current command arithmetic means such that no three-phase line electric current exceeds said continuous maximum rated line electric current.

3. The controller of the rotating electric machine for a vehicle according to claim 1, wherein the controller further comprises rotating speed arithmetic means for detecting the rotating speed of said rotating electric machine, and direct current voltage detecting means for detecting a power voltage applied to the controller, and said magnetic field electric current command restraining means sets a continuous maximum rated line electric current of said rotating electric machine according to the rotating speed and the power voltage, and controls the output of said magnetic field electric current command arithmetic means such that no three-phase line electric current exceeds said continuous maximum rated line electric current.

4. The controller of the rotating electric machine for a vehicle according to claim 1, wherein the controller further comprises line electric current full wave rectifying arithmetic means for outputting a full wave rectifying signal proportional to a full wave rectifying electric current value of the three-phase line electric current detected by said three-phase line electric current detecting means, and said magnetic field electric current command restraining means inputs said full wave rectifying signal, and controls the output of said magnetic field electric current command arithmetic means such that said full wave rectifying signal becomes a continuous maximum rated line electric current corresponding value of said rotating electric machine or less.

5. The controller of the rotating electric machine for a vehicle according to claim 1, wherein the controller is constructed such that said continuous maximum rated line electric current controlled by said magnetic field electric current command restraining means is corrected by the output of a temperature sensor arranged in said rotating electric machine, or the output of a temperature sensor arranged in said electric power converter.

* * * * *